(12) United States Patent
Akimoto et al.

(10) Patent No.: US 11,829,722 B2
(45) Date of Patent: Nov. 28, 2023

(54) PARAMETER LEARNING APPARATUS, PARAMETER LEARNING METHOD, AND COMPUTER READABLE RECORDING MEDIUM

(71) Applicant: NEC Corporation, Tokyo (JP)

(72) Inventors: Kosuke Akimoto, Tokyo (JP); Takuya Hiraoka, Tokyo (JP); Kunihiko Sadamasa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 109 days.

(21) Appl. No.: 17/613,549

(22) PCT Filed: May 31, 2019

(86) PCT No.: PCT/JP2019/021883
§ 371 (c)(1),
(2) Date: Nov. 23, 2021

(87) PCT Pub. No.: WO2020/240870
PCT Pub. Date: Dec. 3, 2020

(65) Prior Publication Data
US 2022/0245183 A1    Aug. 4, 2022

(51) Int. Cl.
*G06F 40/20* (2020.01)
*G06F 40/295* (2020.01)
(Continued)

(52) U.S. Cl.
CPC .......... *G06F 40/295* (2020.01); *G06F 40/216* (2020.01); *G06F 40/30* (2020.01)

(58) Field of Classification Search
CPC ............. G06F 16/3334; G06F 16/3346; G06F 16/3347; G06F 40/216; G06F 40/295;
(Continued)

(56) References Cited

U.S. PATENT DOCUMENTS 7,454,430 B1 * 11/2008 Komissarchik ....... G06F 16/345
9,672,251 B1 *  6/2017 Whang ..................... G06N 5/02
(Continued)

FOREIGN PATENT DOCUMENTS

JP     2012-027845 A     2/2012
JP     2018-206263 A     12/2018

OTHER PUBLICATIONS

Article entitled "Cross-Sentence N-ary Relation Extraction using Lower-Arity Universal Schemas", by Akimoto et al, dated Nov. 7, 2019 (Year: 2019).*
(Continued)

*Primary Examiner* — Mahesh H Dwivedi
(74) *Attorney, Agent, or Firm* — Sughrue Mion, PLLC

(57) ABSTRACT

An entity combination and a text representation are obtained as a first fact, and the entity combination and a related predicate are obtained as a second fact. Word distributed representations are input to a neural network, real vectors at appearance positions of entities are specified and used as distributed representations. A first score indicating a degree of establishment of the first fact is calculated based on the distributed representations and on entity distributed representations. A second score indicating a degree of establishment is calculated with respect to an entity combination and a text representation that are not the first fact. A third score indicating a degree of establishment of the second fact is calculated based on predicate distributed representations and on entity distributed representations. A fourth score indicating a degree of establishment is calculated also with respect to an entity combination and a predicate that are not the second fact. The entity distributed representations, the predicate distributed representations, or weight parameters are updated by a gradient method, so that the first score becomes higher than one of the second score and the fourth score, and
(Continued)

the third score becomes higher than one of the second score and the fourth score.

6 Claims, 7 Drawing Sheets

(51) Int. Cl.
    *G06F 40/30*     (2020.01)
    *G06F 40/216*     (2020.01)

(58) Field of Classification Search
    CPC .......... G06F 40/30; G06N 3/04; G06N 3/044; G06N 5/041
    See application file for complete search history.

(56) References Cited

U.S. PATENT DOCUMENTS

| | | | | |
|---|---|---|---|---|
| 2005/0108630 A1* | 5/2005 | Wasson | ................ | G06F 40/169 707/E17.084 |
| 2007/0150800 A1* | 6/2007 | Betz | ...................... | G06F 16/951 707/E17.108 |
| 2009/0282012 A1* | 11/2009 | Konig | ..................... | G06F 40/30 707/999.005 |
| 2012/0029908 A1 | 2/2012 | Takamatsu | | |
| 2014/0372248 A1* | 12/2014 | Cohen | ................... | G06Q 10/10 705/26.7 |
| 2015/0052098 A1 | 2/2015 | Kveton et al. | | |
| 2018/0039695 A1* | 2/2018 | Chalabi | .................. | G06N 5/022 |
| 2021/0383249 A1* | 12/2021 | Goyal | ..................... | G06F 16/36 |

OTHER PUBLICATIONS

Article entitled "Collective Cross-Document Relation Extraction Without Labelled Data", by Yao et al., dated Oct. 11, 2010. (Year: 2010).*
English translation of Written opinion for PCT Application No. PCT/JP2019/021883, dated Aug. 13, 2019.
International Search Report for PCT Application No. PCT/JP2019/021883, dated Aug. 13, 2019.
Riedel, Sebastian, et al. "Relation extraction with matrix factorization and universal schemas." Proceedings of the 2013 Conference of the North American Chapter of the Association for Computational Linguistics: Human Language Technologies. 2013, pp. 76-84.
Song. Linfeng. et al. "N-ary Relation Extraction using Graph State LSTM." Proceedings of the 2018 Conference on Empirical Methods in Natural Language Processing. 2018, pp. 2226-2235.

* cited by examiner

Fig.5

FIRST FACT

| ENTITY COMBINATION | TEXT REPRESENTATION |
|---|---|
| <H.F., S.W., H.S.> | "<E1> <E1> plays <E3> <E3> in the <E2> <E2> series." |
| <H.F., S.W., H.S.> | "<E2> <E2> stars <E1> <E1> as <E3> <E3>." |
| <B.W., D.H., J.M.> | "<E2> <E2> stars <E1> <E1>, who plays <E3> <E3> in the movie." |

SECOND FACT

| ENTITY COMBINATION | KNOWN PREDICATE RELATIONSHIP |
|---|---|
| <H.F., S.W., H.S.> | CastAs |

H.F. : Harrison Ford
H.S. : Han Solo
S.W. : StarWars
D.H. : Die Hard
B.W. : Bruce Willis
J.M. : John McClane

Fig.6

MATRIX Y

| | i\j | 1 | 2 | 3 | 4 |
|---|---|---|---|---|---|
| | | CastAs | <E1> <E1> plays <E3> <E3> in the <E2> <E2> series. | <E2> <E2> stars <E1> <E1> as <E3> <E3>. | <E2> <E2> stars <E1> <E1>, who plays <E3> <E3> in the movie. |
| H.F., S.W., H.S. | 1 | | | | |
| B.W., D.H., J.M. | 2 | | | | |

PARAMETER LEARNING APPARATUS, PARAMETER LEARNING METHOD, AND COMPUTER READABLE RECORDING MEDIUM

This application is a National Stage Entry of PCT/JP2019/021883 filed on May 31, 2019, the contents of all of which are incorporated herein by reference, in their entirety.

TECHNICAL FIELD

The present invention relates to a parameter learning apparatus and a parameter learning method for learning parameters of a learning model that extracts a predicate relationship from a document, and also to a computer readable recording medium having recorded therein a program for realizing these apparatus and method.

BACKGROUND ART

Abduction inference means derivation of an appropriate hypothesis from the knowledge (rules) given by a logical formula and from the events that have been observed (observed events). Abduction inference is useful in the field of artificial intelligence, especially in a diagnosis system based on artificial intelligence, for example.

Note that in order to increase the precision of inference based on abduction inference, it is necessary to increase the amount of knowledge that can be used; however, conventionally, the generation of a database of knowledge has been performed by humans. Therefore, for example, in order to automate the generation of a database of knowledge, Non-Patent Document 1 and Non-Patent Document 2 disclose techniques to automatically extract predicate relationships from a large number of documents with use of a model that has been constructed through machine learning in advance.

Specifically, according to the technique disclosed in Non-Patent Document 1, first, a combination of a plurality of entities that co-occur in the same sentence, as well as a text representation for interconnecting these entities, is extracted as pair data from a document. Next, a predicate relationship that is established among the entity combinations of respective pieces of pair data is searched for from a database with which knowledge has been registered in advance.

Furthermore, according to the technique disclosed in Non-Patent Document 1, an i×j matrix is generated by associating the entity combinations of extracted pieces of pair data with respective rows i, and associating the predicate relationships that have been searched for and the text representations of the pieces of pair data with respective columns j. Then, with respect to the element at the $i^{th}$ row and the $j^{th}$ column in the matrix, if a corresponding entity combination is extracted, and furthermore, there is a corresponding predicate relationship or text representation, this element is deemed to be "1", and if not, this element is deemed "unknown".

Subsequently, with regard to the element that has been deemed "unknown", the technique disclosed in Non-Patent Document 1 calculates the probability that this element is "1". The probability is calculated by calculating the inner products of parameter vectors of respective arguments of the predicate relationship that corresponds to this element and parameter vectors of entities of the pair data that similarly corresponds to this element, and by further calculating the sum of the inner products.

Then, learning of parameter vectors is performed by a machine learning engine so that the probability of the element that is "1" is higher than the probability of the element that has been deemed "unknown", and a model is constructed. Thereafter, when a plurality of entities which have been included in a specific document and for which the predicate relationship is unknown have been input to a matrix that has been generated using this model, a score indicating a degree of certainty at which a predetermined predicate relationship is established among these plurality of entities is output.

Furthermore, according to the technique disclosed in Non-Patent Document 2 as well, first, a combination of a plurality of entities that co-occur in the same sentences, as well as a text representation for interconnecting these entities, is extracted as pair data from a document, similarly to the technique disclosed in Non-Patent Document 1. Next, a predicate relationship corresponding to the extracted pair data is searched for from a database with which knowledge has been registered in advance.

Note that the technique disclosed in Non-Patent Document 2 subsequently performs syntactic analysis with respect to each document, and generates a graph that shows the syntactic relationships among words in the—sentences as edges based on the result of the analysis. Then, the entity combination in the extracted pair data is associated with the graph, and if the aforementioned predicate relationship has been searched for with respect to the entity combination associated with the graph, this predicate relationship is appended to the graph as a label.

Subsequently, according to the technique disclosed in Non-Patent Document 2, a model that calculates vectors with respect to words at respective nodes of the graph is constructed using a neural network called Graph State LSTM. Next, the entity combination associated with the graph is used as a target, vectors are calculated for words in the sentences that respectively correspond to the entities with use of the model constructed earlier, and the calculated vectors are used as vectors of these entities.

Then, with use of the entity combination for which vectors have been calculated and the predicate relationship that has been searched for in connection with this entity combination, the technique disclosed in Non-Patent Document 2 constructs a classifier that uses entities as inputs and outputs a predicate relationship. When a plurality of entities which are included in a specific document and for which the predicate relationship is unknown have been input to this classifier, a corresponding predicate relationship is output.

LIST OF RELATED ART DOCUMENTS

Non-Patent Document

Non-Patent Document 1: Riedel, Sebastian, et al. "Relation extraction with matrixfactorization and universal schemas." Proceedings of the 2013 Conference of the North American Chapter of the Association for Computational Linguistics: Human Language Technologies. 2013

Non-Patent document 2: Song, Linfeng, et al. "N-ary Relation Extraction using Graph-State LSTM." Proceedings of the 2018 Conference on Empirical Methods in Natural Language Processing. 2018.

SUMMARY OF INVENTION

Problems to be Solved by the Invention

However, according to the technique disclosed in Non-Patent Document 1, independent parameter vectors are used respectively for distinguishable text representations. Meanwhile, it is often the case that the frequency at which a certain, specific text representation between entities appears in a document decreases with an increase in the number of entities whose relationships are represented in this text representation. Therefore, the technique disclosed in Non-Patent Document 1 has a possibility that, if the number of arguments (entities) of a predicate relationship is three or more, negative effects are exerted on learning due to a decrease in the frequency at which parameter vectors corresponding to a certain, specific text representation appears during the learning.

On the other hand, according to the technique disclosed in Non-Patent Document 2, the aforementioned problem does not occur, but when a text representation with no label appended thereto has been used as learning data, this learning data becomes negative example, which brings about the possibility that an appropriate predicate relationship is not output.

An example object of the present invention is to solve the aforementioned problems, and to provide a parameter learning apparatus, a parameter learning method, and a computer readable recording medium in which a text representation with no label appended thereto can also be used as learning data in the extraction of a predicate relationship from a document, and in addition, parameters for the extraction can be learned so that the performance is not influenced by the number of arguments of a predicate to be output.

Means for Solving the Problems

In order to achieve the aforementioned object, a parameter learning apparatus according to an example aspect of the present invention includes:

a first fact obtainment unit configured to, based on a document in which entities represented by a string of words appear and on information indicating appearance positions of entities within a predetermined range in the document, obtain, as first facts, pairs of a combination of entities which co-occur in the document and which are within the predetermined range, and a text representation to which the combination can be applied;

a second fact obtainment unit configured to extract, from a database in which entities and related predicates have been registered in advance, a predicate related to the combination of entities within the predetermined range, and obtain, as second facts, pairs of the extracted predicate and the combination of entities within the predetermined range related thereto;

a distributed representation calculation unit configured to obtain, from the text representation in each of the obtained first facts, a word distributed representation that represents a word by means of a real vector for each word that composes the text representation, input the obtained word distributed representations to a recurrent neural network, and cause outputting of a series of real vectors that are different from the word distributed representations, the recurrent neural network using a series of the predetermined number of real vectors as inputs and outputting the predetermined number of different real vectors, and further specify, from the series of different real vectors that has been output, real vectors corresponding to appearance positions of entities in the corresponding first fact, and extract the specified real vectors as distributed representations of the text representation in the corresponding first fact;

a first score calculation unit configured to for each of the obtained first facts, calculate a first score indicating a degree of establishment of the first fact based on the distributed representations of the text representation that have been extracted in connection with the first fact, and on entity distributed representations that respectively represent features of entities in the first fact by means of real vectors, and also with respect to a pair of an entity combination and a text representation that has not been obtained as the first fact, calculate a second score indicating a degree of establishment of the pair based on distributed representations obtained from the text representation and on entity distributed representations that represent features of entities composing the entity combination by means of real vectors;

a second score calculation unit configured to for each of the obtained second facts, calculate a third score indicating a degree of establishment of the second fact based on predicate distributed representations that represent features of the predicate in the second fact by means of real vectors, and on entity distributed representations that respectively represent features of entities in the second fact by means of real vectors, and also with respect to a pair of an entity combination and a predicate that has not been obtained as the second fact, calculate a fourth score indicating a degree of establishment of the pair based on predicate distributed representations that represent features of the predicate by means of real vectors, and on entity distributed representations that represent features of entities composing the entity combination by means of real vectors; and a parameter learning unit configured to update the entity distributed representations, the predicate distributed representations, or weight parameters of the recurrent neural network with use of a gradient method, so that the first score becomes higher than at least one of the second score and the fourth score, and the third score becomes higher than at least one of the second score and the fourth score.

Also, in order to achieve the aforementioned object, a parameter learning method according to an example aspect of the present invention includes:

(a) a step of, based on a document in which entities represented by a string of words appear and on information indicating appearance positions of entities within a predetermined range in the document, obtaining, as first facts, pairs of a combination of entities which co-occur in the document and which are within the predetermined range, and a text representation to which the combination can be applied;

(b) a step of extracting, from a database in which entities and related predicates have been registered in advance, a predicate related to the combination of entities within the predetermined range, and obtaining, as second facts, pairs of the extracted predicate and the combination of entities within the predetermined range related thereto;

(c) a step of obtaining, from the text representation in each of the obtained first facts, a word distributed representation that represents a word by means of a real vector for each word that composes the text representation, inputting the obtained word distributed representations to a recurrent neural network, and causing outputting of a series of real vectors that are different from the word distributed representations, the recurrent neural network using a series of the predetermined number of real vectors as inputs and outputting the predetermined number of different real vectors, and further specifying, from the series of different real vectors that has been output, real vectors corresponding to appearance positions of entities in the corresponding first fact, and extracting the specified real vectors as distributed representations of the text representation in the corresponding first fact;

(d) a step of for each of the obtained first facts, calculating a first score indicating a degree of establishment of the first fact based on the distributed representations of the text representation that have been extracted in connection with the first fact, and on entity distributed representations that respectively represent features of entities in the first fact by means of real vectors, and also with respect to a pair of an entity combination and a text representation that has not been obtained as the first fact, calculating a second score indicating a degree of establishment of the pair based on distributed representations obtained from the text representation and on entity distributed representations that represent features of entities composing the entity combination by means of real vectors;

(e) a step of for each of the obtained second facts, calculating a third score indicating a degree of establishment of the second fact based on predicate distributed representations that represent features of the predicate in the second fact by means of real vectors, and on entity distributed representations that respectively represent features of entities in the second fact by means of real vectors, and also with respect to a pair of an entity combination and a predicate that has not been obtained as the second fact, calculating a fourth score indicating a degree of establishment of the pair based on predicate distributed representations that represent features of the predicate by means of real vectors, and on entity distributed representations that represent features of entities composing the entity combination by means of real vectors; and (f) a step of updating the entity distributed representations, the predicate distributed representations, or weight parameters of the recurrent neural network with use of a gradient method, so that the first score becomes higher than at least one of the second score and the fourth score, and the third score becomes higher than at least one of the second score and the fourth score.

Also, in order to achieve the aforementioned object, a computer readable recording medium according to an example aspect of the present invention is characterized by including a program recorded thereon, the program including instructions that cause a computer to carry out (a) a step of, based on a document in which entities represented by a string of words appear and on information indicating appearance positions of entities within a predetermined range in the document, obtaining, as first facts, pairs of a combination of entities which co-occur in the document and which are within the predetermined range, and a text representation to which the combination can be applied, (b) a step of extracting, from a database in which entities and related predicates have been registered in advance, a predicate related to the combination of entities within the predetermined range, and obtaining, as second facts, pairs of the extracted predicate and the combination of entities within the predetermined range related thereto, (c) a step of obtaining, from the text representation in each of the obtained first facts, a word distributed representation that represents a word by means of a real vector for each word that composes the text representation, inputting the obtained word distributed representations to a recurrent neural network, and causing outputting of a series of real vectors that are different from the word distributed representations, the recurrent neural network using a series of the predetermined number of real vectors as inputs and outputting the predetermined number of different real vectors, and further specifying, from the series of different real vectors that has been output, real vectors corresponding to appearance positions of entities in the corresponding first fact, and extracting the specified real vectors as distributed representations of the text representation in the corresponding first fact, (d) a step of for each of the obtained first facts, calculating a first score indicating a degree of establishment of the first fact based on the distributed representations of the text representation that have been extracted in connection with the first fact, and on entity distributed representations that respectively represent features of entities in the first fact by means of real vectors, and also with respect to a pair of an entity combination and a text representation that has not been obtained as the first fact, calculating a second score indicating a degree of establishment of the pair based on distributed representations obtained from the text representation and on entity distributed representations that represent features of entities composing the entity combination by means of real vectors, (e) a step of for each of the obtained second facts, calculating a third score indicating a degree of establishment of the second fact based on predicate distributed representations that represent features of the predicate in the second fact by means of real vectors, and on entity distributed representations that respectively represent features of entities in the second fact by means of real vectors, and also with respect to a pair of an entity combination and a predicate that has not been obtained as the second fact, calculating a fourth score indicating a degree of establishment of the pair based on predicate distributed representations that represent features of the predicate by means of real vectors, and on entity distributed representations that represent features of entities composing the entity combination by means of real vectors, and (f) a step of updating the entity distributed representations, the predicate distributed representations, or weight parameters of the recurrent neural network with use of a gradient method, so that the first score becomes higher than at least one of the second score and the fourth score, and the third score becomes higher than at least one of the second score and the fourth score.

Advantageous Effects of the Invention

As described above, according to the present invention, a text representation with no label appended thereto can also be used as learning data in the extraction of a predicate relationship from a document, and in addition, parameters for the extraction can be learned so that the performance is not influenced by the number of arguments of a predicate to be output.

BRIEF DESCRIPTION OF THE DRAWINGS

FIG. 5 is a diagram illustrating examples of first facts and second facts obtained in a specific example of the example embodiment.

FIG. 6 is a diagram illustrating a score calculated in the specific example of the example embodiment.

EXAMPLE EMBODIMENT

Premise of Present Invention

First, in the specification of the present application, an "entity" denotes, for example, an object, a matter, a person, or a concept that appears in an event, and is expressed as a string of words. Examples of the entity include "Obama", "U.S." (proper nouns), "human" (a noun that describes a concept or a type), and so forth.

Also, a "predicate relationship" is defined by a predicate and entities, and categorizes a relationship established among entities based on the meaning of that relationship. One example of the predicate relationship is president (Obama, U.S.). This example indicates that there is a relationship categorized based on "president", which is a predicate relationship meaning that "X is the president of Y", between the entities "Obama" and "U.S.". Furthermore, a predicate relationship that is individually categorized, such as "president", is also referred to as a "predicate". In addition, "Obama" and "U.S." in the aforementioned predicate relationship "president (Obama, U.S.)" are the arguments of the predicate relationship.

In the present example embodiment, "extraction of a predicate relationship" means to extract, from a document, an entity combination that establishes a pre-defined predicate relationship. In the present invention, parameters of a learning model used in this extraction of an entity combination are learned.

For example, assume that there is a document "American Airlines, a unit of AMR, immediately matched the move, spokesman Tim Wagner said". Also assume that the predicate relationships to be extracted are "subsidiary" meaning that "X is a subsidiary of Y", and "employee" meaning that "X is an employee of Y". In this case, with regard to subsidiary, the learning model extracts American Airlines and AMR as an entity combination that establishes a pre-defined predicate relationship. Also, with regard to employee, Tim Wagner and American Airlines are extracted.

Furthermore, although the number of extracted entities (arguments) is two in the aforementioned example, three or more entities can also be extracted by a learning model in which parameters have been learned according to the present invention.

For example, assume that there is a document "Rainbow Sun Francks (born Dec. 3, 1979) is a Canadian actor and singer known for his role as Lt. Aiden Ford in the television show 'Stargate Atlantis'". Furthermore, assume that the predicate relationship to be extracted is "Cast-As" meaning that "X (actor) plays Z (character) in Y (movie)". In this case, the learning model extracts Rainbow Sun Francks, Stargate Atlantis, and Lt. Aiden Ford as an entity combination that establishes Cast-As.

EXAMPLE EMBODIMENT

The following describes a parameter learning apparatus, a parameter learning method, and a program according to an example embodiment of the present invention with reference to FIG. 1 to FIG. 7.

[Apparatus Configuration]

Figure 1:
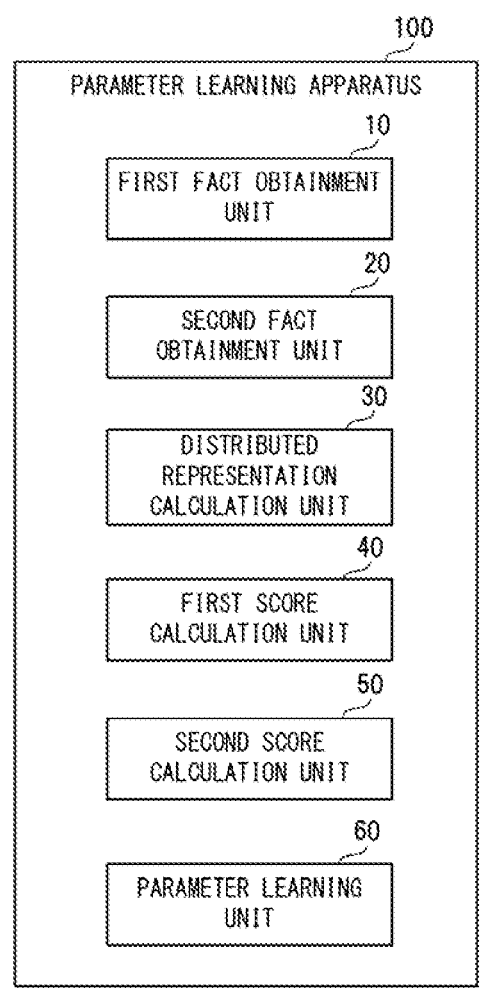
FIG. 1 is a block diagram illustrating a configuration of a parameter learning apparatus according to an example embodiment.

First, a configuration of the parameter learning apparatus according to the present example embodiment will be described using FIG. 1. FIG. 1 is a block diagram illustrating the configuration of the parameter learning apparatus according to the example embodiment.

A parameter learning apparatus 100 according to the present example embodiment illustrated in FIG. 1 learns parameters of a learning model that extracts a predicate relationship from a document. As illustrated in FIG. 1, the parameter learning apparatus 100 includes a first fact obtainment unit 10, a second fact obtainment unit 20, a distributed representation calculation unit 30, a first score calculation unit 40, a second score calculation unit 50, and a parameter learning unit 60.

The first fact obtainment unit 10 obtains first facts based on a document in which entities, which are a string of words, appear, and on information indicating the appearance positions of entities that are within a predetermined range in the document (hereinafter referred to as "appearance position information"). A first fact is composed of a pair of a combination of entities which co-occur in a document and which are within a predetermined range, and a text representation to which the combination can be applied.

The second fact obtainment unit 20 obtains second facts by extracting, from a database in which entities and related predicates have been registered in advance (hereinafter referred to as a "predicate database"), a predicate related to the combination of entities that are within the predetermined range. A second fact is composed of a pair of the extracted predicate and the related combination of entities that are within the predetermined range.

The distributed representation calculation unit 30 first obtains, from a text representation in each of the obtained first facts, a word distributed representation that represents a word by means of a real vector for each word that composes the text representation. Next, the distributed representation calculation unit 30 inputs the obtained word distributed representations to a recurrent neural network, thereby causing outputting of a series of real vectors that are different from the word distributed representations. The recurrent neural network is a neural network that, using the series of the predetermined number of real vectors as input, outputs the predetermined number of different real vectors.

Thereafter, the distributed representation calculation unit 30 specifies, from the series of different real vectors output from the recurrent neural network, real vectors corresponding to the appearance positions of entities in the corresponding first fact. Then, the distributed representation calculation unit 30 extracts the specified real vectors as distributed representations of the text representation of the corresponding first fact.

For each of the obtained first facts, the first score calculation unit 40 calculates a first score indicating a degree of establishment of the first fact based on the distributed representations of the text representation that have been extracted in connection with the first fact, and on entity distributed representations. In this case, the entity distributed representations are distributed representations that respectively represent the features of the entities in the first fact by means of real vectors.

Furthermore, also with respect to a pair of an entity combination and a text representation that has not been obtained as a first fact, the first score calculation unit 40 calculates a second score that indicates a degree of establishment of this pair based on distributed representations obtained from this text representation and on entity distributed representations. In this case, the entity distributed representations are distributed representations that represent the features of entities that compose the entity combination in the aforementioned pair by means of real vectors.

For each of the obtained second facts, the second score calculation unit 50 calculates a third score indicating a degree of establishment of the second fact based on predicate distributed representations that represent the characteristics of the predicate in the second fact by means of real vectors, and on entity distributed representations. In this case, the entity distributed representations are distributed representations that respectively represent the characteristics of the entities in the second fact by means of real vectors.

Furthermore, also with respect to a pair of an entity combination and a predicate that has not been obtained as a second fact, the second score calculation unit 50 calculates a fourth score indicating a degree of establishment of this pair based on predicate distributed representations that represent the features of this predicate by means of real vectors, and on entity distributed representations. In this case, the entity distributed representations are distributed representations that represent the features of entities that compose the entity combination in the aforementioned pair by means of real vectors.

The parameter learning unit 60 updates the entity distributed representations, the predicate distributed representations, or the weight parameters of the recurrent neural network with use of a gradient method, so that the first score becomes higher than at least one of the second score and the fourth score, and the third score becomes higher than at least one of the second score and the fourth score.

As described above, according to the present example embodiment, with respect to a pair that has been extracted as the first fact or the second fact among pairs of an entity combination and a predicate relationship or a text representation, learning of parameters is performed so that a high score is calculated compared to a pair that has not been extracted thereas. This, accordingly, achieves an advantageous effect whereby, in a case where a first fact and a second fact including a combination of similar entities have been obtained, there is a similar tendency between the predicate relationships and the text representations in terms of the magnitudes of scores. Due to this similarity relationship, a predicate relationship can be predicted even from a text representation to which a label of a predicate relationship has not been directly appended in training data.

Furthermore, in a combination of entities that co-occur in a document, the number of entities is not restricted. In this state, the entity distributed representations, the predicate distributed representations, and the weight parameters of the recurrent neural network are each updated. According to the present example embodiment, learning of parameters for extraction can be performed so that the performance is not influenced by the number of arguments of a predicate relationship to be output.

Figure 2:
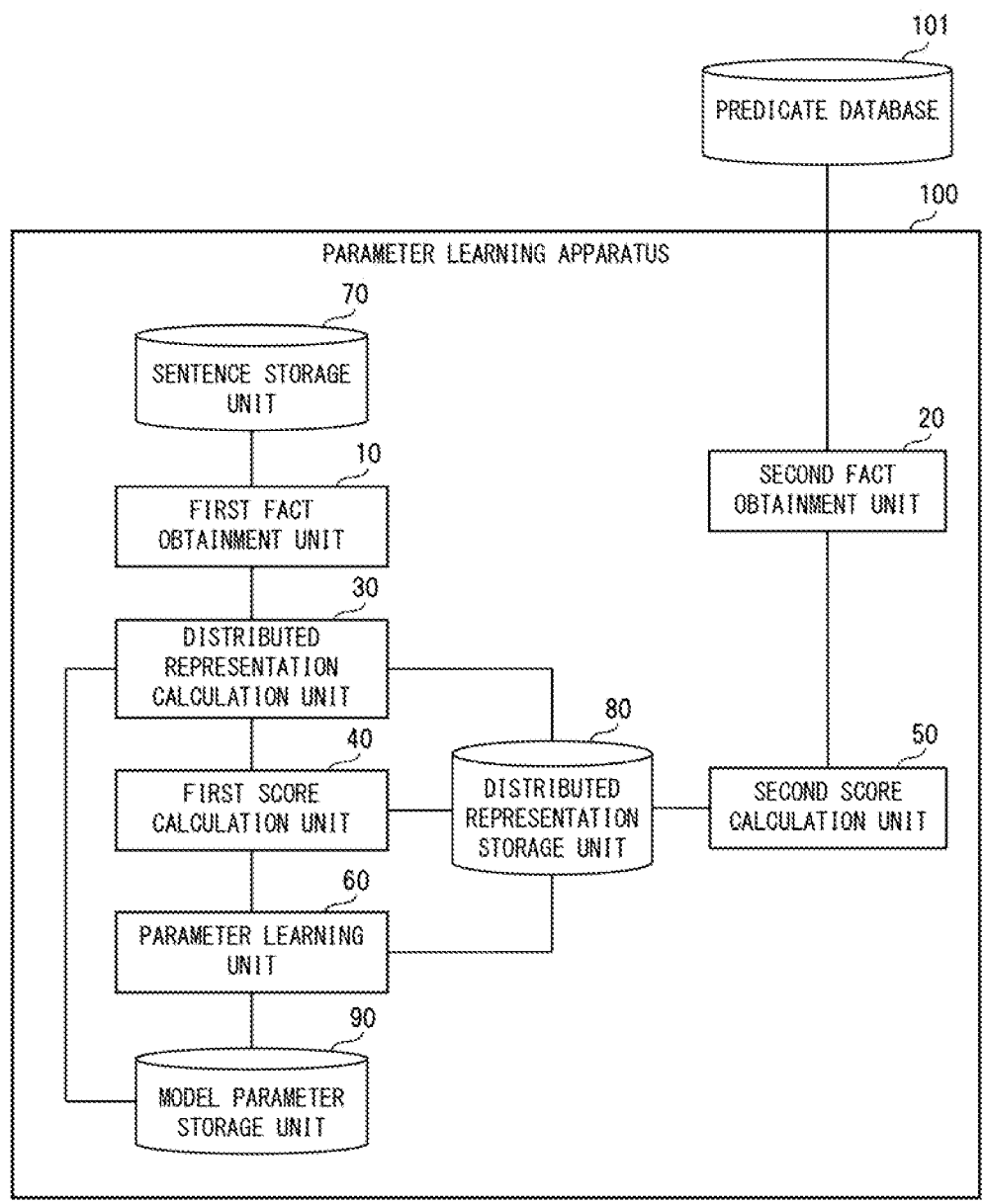
FIG. 2 is a block diagram that illustrates the configuration of the parameter learning apparatus according to the example embodiment in a more specific manner.

Subsequently, the configuration and functions of the parameter learning apparatus 100 according to the present example embodiment will be described more specifically using FIG. 2. FIG. 2 is a block diagram that illustrates the configuration of the parameter learning apparatus according to the example embodiment in a more specific manner. As illustrated in FIG. 2, in the present example embodiment, the parameter learning apparatus 100 is connected to an external predicate database 101.

Furthermore, the parameter learning apparatus 100 includes a document storage unit 70, a distributed representation storage unit 80, and a model parameter storage unit 90 in addition to the aforementioned constituents. The document storage unit 70 stores documents and appearance position information. The distributed representation storage unit 80 stores real vectors that can be used as word distributed representations, real vectors that can be used as entity distributed representations, and real vectors that can be used as predicate distributed representations. The model parameter storage unit 90 stores the weight parameters of the recurrent neural network.

In the present example embodiment, the range of entities is set in advance in accordance with predicate relationships to be output, such as proper nouns related to a person or a nation. Furthermore, the appearance position information is stored in a form that makes it possible to understand the positions at which a plurality of entities appears in the original document on a word-by-word basis, like "<entity1><entity1> is a president of <entity2><entity2>" with respect to a document "Barack Obama is a president of the U.S.", for example. In this example, based on the document and the appearance position information, the first fact obtainment unit 10 obtains the following pair of an entity combination and a text representation as a first fact. The appearance position information may be obtained as the text representation.

The entity combination: <Barack Obama, the U.S.>

The text representation: <entity1><entity1> is a president of <entity2><entity2>

Entities (proper nouns related to a person or a nation) and a related predicate are registered as a predicate relationship in the predicate database 101 in advance. In the present example embodiment, the second fact obtainment unit 20 searches the predicate database 101 by using the entity combination that is used also by the first fact obtainment unit 10 as a query, thereby extracting a predicate related to this entity combination. The second fact obtainment unit 20 obtains a pair of this entity combination and the extracted predicate as a second fact.

In the present example embodiment, the distributed representation calculation unit 30 obtains distributed representations (real vectors) of a text representation with use of the real vectors that can be used as word distributed representations, which are stored in the distributed representation storage unit 80, as well as the weight parameters of the recurrent neural network stored in the model parameter storage unit 90.

Figure 3:
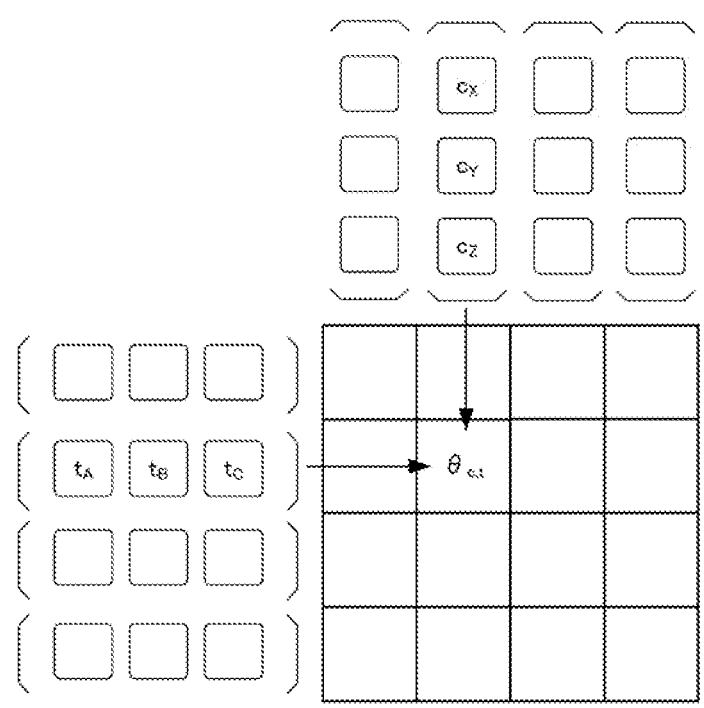
FIG. 3 is a diagram illustrating a score calculated in the example embodiment.

Processing performed by the first score calculation unit 40 and the second score calculation unit 50 will be further described using FIG. 3. FIG. 3 is a diagram illustrating a score calculated in the example embodiment.

FIG. 3 illustrates a score matrix Y. As illustrated in FIG. 3, in the score matrix Y, each row i is defined by an "entity combination" that composes a first fact or a second fact, and each column j is defined by a "text representation" that composes a first fact and a "predicate" that composes a second fact. Furthermore, the scores calculated by the first score calculation unit 40 and the second score calculation unit 50 are used as respective elements of the score matrix Y.

Specifically, assume that the entity combination of the row t is (A, B, C), and the entity distributed representations thereof are $(t_A, t_B, t_C)$, as illustrated in FIG. 3. Also assume that the text representation of the column c is "X is chief of Z at Y.", and the distributed representations of this text representation are "$c_X, c_Y, c_Z$". In this case, the first score calculation unit 40 inputs the entity distributed representations $(t_A, t_B, t_C)$ and the distributed representations $(c_X, c_Y, c_Z)$ of the text representation to a score function, and calculates a score $\theta_{c,t}$. Also, in a case where the row represents a predicate, the second score calculation unit 50 calculates the score $\theta_{c,t}$ by using the score function.

The function indicated by the following Math. 1 can be used as the score function. According to the score function indicated by Math. 1, the inner product of the entity distributed representation, and the predicate distributed representation and the distributed representation of the text representation is calculated on a per-argument basis, and furthermore, the results that have been obtained as the inner products respectively for the arguments are summed and used as the score. Note that in Math. 1, tuple[i] denotes the $i^{th}$ entity in the entity combination corresponding to the entity distributed representations.

$$f_{score}(\{(c_i, t_{tuple[i]})\}_i) = \sum_i c_i^T t_{tuple[i]} \quad \text{[Math. 1]}$$

The parameter learning unit 60 performs learning by updating parameters of the score function indicated by the aforementioned Math. 1 with use of a gradient method based on a loss function that derives a smaller value as the restrictions of the following Math. 2 and Math. 3 are satisfied. The parameters of the score function are entity distributed representations and predicate distributed representations, and furthermore, weight parameters of the recurrent neural network that derives distributed representations of a text representation.

One example of the loss function is the function indicated by the following Math. 4. The loss function indicated by the following Math. 4 calculates a value by applying a sigmoid function σ to the difference between the first score (or the third score) $\theta\hat{}+$ and the second score (or the fourth score) $\theta\hat{}-$, and outputs the negative of the logarithm of this value as a loss.

First Score>Second Score and/or Fourth Score  [Math. 2]

Third score>Second Score and/or Fourth Score  [Math. 3]

$L = -\log(\sigma(\theta^+ - \theta^-))$ [Math. 4]

As described above, according to the present example embodiment, in learning the parameters of the score function, entity distributed representations and predicate distributed representations per se are updated, whereas with regard to distributed representations of a text representation, the weight parameters of the recurrent neural network that derives the same are updated.

[Apparatus Operations]

Figure 4:
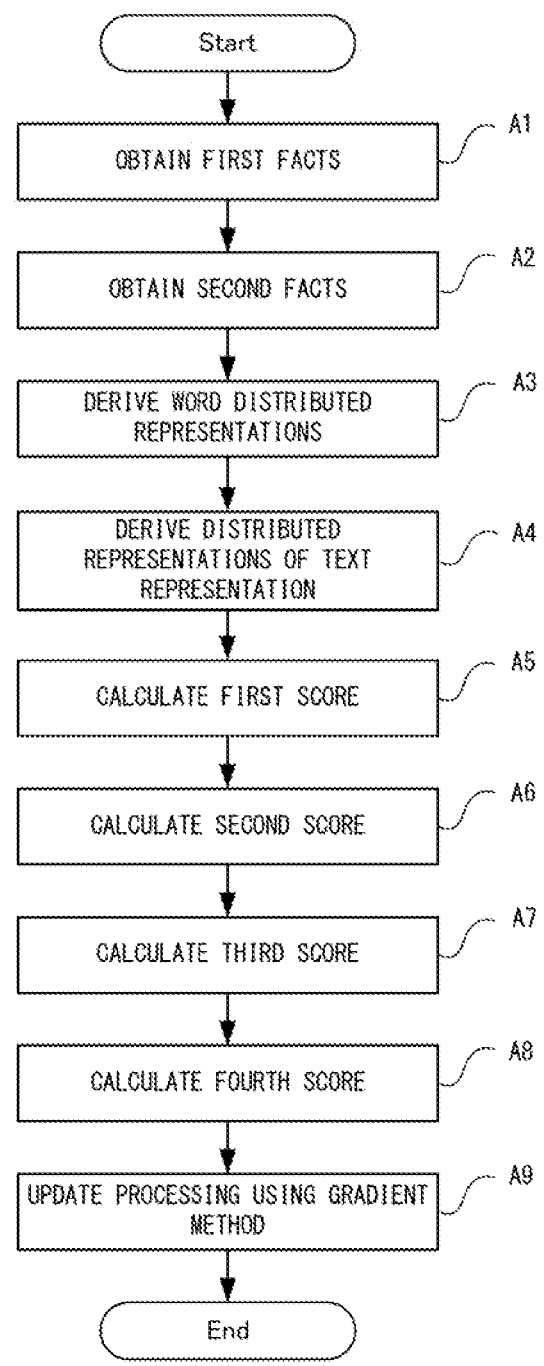
FIG. 4 is a flow diagram illustrating the operations of the parameter learning apparatus according to the example embodiment.

Next, the operations of the parameter learning apparatus 100 according to the example embodiment of the present invention will be described using FIG. 4. FIG. 4 is a flow diagram illustrating the operations of the parameter learning apparatus according to the example embodiment of the present invention. In the following description, FIG. 1 to FIG. 3 will be referred to as appropriate. Furthermore, in the present example embodiment, the parameter learning method is implemented by causing the parameter learning apparatus to operate. Therefore, the following description of the operations of the parameter learning apparatus 100 applies to the parameter learning method according to the present example embodiment.

As illustrated in FIG. 4, first, in the parameter learning apparatus 100, the first fact obtainment unit 10 obtains documents corresponding to first facts to be obtained, as well as appearance position information, from the document storage unit 70. Then, the first fact obtainment unit 10 obtains the first facts based on the obtained documents and appearance position information (step A1). A first fact is composed of a pair of a combination of entities which co-occur in a document and which are within a predetermined range, and a text representation to which the combination can be applied.

Next, the second fact obtainment unit 20 accesses the predicate database 101, extracts predicates related to the entity combinations within the predetermined range from the predicate database 101, and obtains the predicates as second facts (step A2). A second fact is composed of a pair of the extracted predicate and the related entity combination within the predetermined range.

Next, the distributed representation calculation unit 30 obtains, from the text representation in each of the first facts obtained in step A1, a word distributed representation for each word that composes the text representation (step A3). Specifically, the distributed representation calculation unit 30 accesses the distributed representation storage unit 80, and extracts a corresponding word distributed representation from among word distributed representations stored therein.

Next, the distributed representation calculation unit 30 inputs the word distributed representations obtained in step A3 to the recurrent neural network, thereby causing outputting of a series of real vectors that are different from the word distributed representations. Furthermore, the distributed representation calculation unit 30 specifies, from the series of different real vectors that has been output, real vectors corresponding to the appearance positions of entities in the corresponding first fact, and extracts the specified real vectors as distributed representations of the text representation of the corresponding first fact (step A4).

Next, for each of the first facts obtained in step A1, the first score calculation unit 40 calculates a first score indicating a degree of establishment of the first fact based on the distributed representations of the text representation that have been extracted in connection with the first fact, and on entity distributed representations (step A5). Specifically, in step A5, the first score calculation unit 40 calculates the first score with use of the score function in the aforementioned Math. 1.

Subsequently, also with respect to a pair of an entity combination and a text representation that has not been obtained as a first fact, the first score calculation unit 40 calculates a second score that indicates a degree of establishment of this pair based on distributed representations obtained from this text representation and on entity distributed representations (step A6). Specifically, in step A6, the first score calculation unit 40 calculates the second score with use of the score function in the aforementioned Math. 1.

Next, for each of the second facts obtained in step A2, the second score calculation unit 50 calculates a third score indicating a degree of establishment of the second fact based on predicate distributed representations of the predicate in the second fact and on entity distributed representations (step A7). Specifically, in step A7, the second score calculation unit 50 calculates the third score with use of the score function in the aforementioned Math. 1.

Subsequently, also with respect to a pair of an entity combination and a predicate that has not been obtained as a second fact, the second score calculation unit 50 calculates a fourth score indicating a degree of establishment of this pair based on predicate distributed representations of this predicate and on entity distributed representations (step A8).

Specifically, in step A8, the second score calculation unit 50 calculates the fourth score with use of the score function in the aforementioned Math. 1.

Next, the parameter learning unit 60 updates the parameters of the score function indicated by the aforementioned Math. 1, that is to say, the entity distributed representations, the predicate distributed representations, and the weight parameters of the recurrent neural network, with use of a gradient method so that the output of the loss function indicated by the aforementioned Math. 4 is reduced (step A9). The processing in the parameter learning apparatus 100 is completed by the execution of step A9.

Specific Example

Subsequently, using FIG. 5 and FIG. 6, the following describes a specific example of the processing performed by the parameter learning apparatus 100 according to the present example embodiment. FIG. 5 is a diagram illustrating examples of first facts and second facts obtained in the specific example of the example embodiment. FIG. 6 is a diagram illustrating a score calculated in the specific example of the example embodiment.

First, in the present specific example, the document storage unit 70 stores the following documents (1) to (3).
(1) Harrison Ford plays Han Solo in the Star Wars series.
(2) Star Wars stars Harrison Ford as Han Solo.
(3) Die Hard stars Bruce Willis, who plays John McClane in the movie.

Furthermore, a predicate relationship "CastAs", which means that "a certain actor plays a certain character in a certain movie", is registered in the predicate database 101. This predicate relationship "CastAs" has three arguments, namely actor, movie, and character, in this order. Specifically, the following relationship, which indicates that CastAs is established among Harrison Ford, Star Wars, and Han Solo, is registered.

CastAs (Harrison Ford, Star Wars, Han Solo)

In the present specific example, the range of entities to be considered involves proper nouns related to the names of people, the names of movies, and the names of characters. Therefore, the first fact obtainment unit 10 extracts Harrison Ford, Han Solo, and Star Wars from the document (1) as an entity combination, or as entities that co-occur in the document within this range. The first fact obtainment unit 10 also extracts Star Wars, Harrison Ford, and Han Solo from the document (2). The first fact obtainment unit 10 further extracts Die Hard, Bruce Willis, and John McClane from the document (3).

In this case, the first fact obtainment unit 10 obtains the first facts illustrated in FIG. 5. In FIG. 5, each entity is denoted by initials. Also, position information of the entities in a text representation (the arguments in the text representation) is denoted by, for example, denoting the position of the first entity as <E1> with respect to the corresponding entity combination in the first facts.

Furthermore, the second fact obtainment unit 20 extracts the second fact illustrated in FIG. 5 based on the aforementioned predicate relationship and the extracted entity combination.

In addition, in the present specific example, the score matrix Y is as illustrated in FIG. 6. In FIG. 6, i=1: <H.F., S.W., H.S.>, and i=2: <B.W., D.H., J.M.>. Also, j=1: CastAs, j=2: "<E1><E1> plays <E3><E3> in the <E2><E2> series.", j=3: "<E2><E2> stars <E1><E1> as <E3><E3>.", and j=4: "<E2><E2> stars <E1><E1>, who plays <E3><E3> in the movie.".

Furthermore, in the present specific example, a parameter vector $t_c$ is prepared as an entity distributed representation for each of the entities (e=H.F., S.W., H.S., B.W., D.H., J.M.). Moreover, parameter vectors ($d_{actor}$, $d_{movie}$, $d_{character}$) that respectively correspond to the three arguments (actor, movie, character) of the predicate relationship "CastAs" are prepared as predicate distributed representations.

Distributed representations of a text representation are obtained using the recurrent neural network. A description is now given of the method of obtaining distributed representations of a text representation, using the text representation "<E1><E1> plays <E3><E3> in the <E2><E2> series." corresponding to j=2 as an example.

First, as word distributed representations (parameter vectors) are prepared respectively for 11 words in the aforementioned text representation (including the period: <E1>, <E1>, plays, . . . , series,), the distributed representation calculation unit 30 obtains these. Note that the same word distributed representation is used for the words of the same type that appear multiple times in an overlapping manner (in the aforementioned example, <E1> and <E2> apply).

Subsequently, the distributed representation calculation unit 30 inputs the word distributed representations to the recurrent neural network (Bidirectional-LSTM [3]), and receives the output 11 vectors at respective word positions.

Next, the distributed representation calculation unit 30 calculates vectors at the positions of respective entities (<E1>, <E2>, <E3>) with use of the received 11 vectors. In the present specific example, for example, as <E1> is at the first and second positions from the start, the distributed representation calculation unit 30 specifies vectors at the first and second positions among the received vectors, and uses the average of the specified vectors as the vector at <E1>. Respective vectors that have been obtained in the foregoing manner are used as vectors $d_{<E1>}$, $d_{<E2>}$, and $d_{<E3>}$ that respectively correspond to the arguments <E1>, <E2>, and <E3> in the text representation "<E1><E1> plays <E3><E3> in the <E2><E2> series.".

Subsequently, the calculation of a score based on the score function with use of these distributed representations (vectors) will be described using an example. The following describes the calculation of a score with respect to two elements, namely (i,j)=(1,1), (1,3), as an example.

The case of (i,j)=(1,1):

The entity combination corresponding to i=1 is <H.F., S.W., H.S.>, and the predicate corresponding to j=1 is Cast As. Also, $t_{H.F.}$, $t_{S.W.}$, and $t_{H.S.}$ are prepared as the vectors of respective entities that compose this entity combination. Furthermore, as stated earlier, parameter vectors ($d_{actor}$, $d_{movie}$, $d_{character}$) are prepared as predicate distributed representations respectively for the three arguments (actor, movie, character) of the predicate relationship "CastAs". Therefore, the second score calculation unit 50 calculates a score $\theta_{11}$ (the third score) with use of the following Math. 5.

$$\theta_{11} = d_{movie} \cdot t_{H.F.} + d_{actor} \cdot t_{S.W.} + d_{character} \cdot t_{H.S.} \quad \text{[Math. 5]}$$

The case of (i,j)=(1,3):

The entity combination is <H.F., S.W., H.S.>, similarly to the aforementioned case. The text representation "<E2><E2> stars <E1><E1> as <E3><E3>." corresponds to j=3. Therefore, the distributed representation calculation unit 30 obtains vectors $d_{<E1>}$, $d_{<E2>}$, and $d_{<E3>}$ as the distributed representations of the text representation. Thus, the first score calculation unit 40 calculates a score $\theta_{13}$ (the first score) with use of the following Math. 6.

$$\theta_{13} = d_{<E1>} \cdot t_{H.F.} + d_{<E2>} \cdot t_{S.W.} + d_{<E3>} \cdot t_{H.S.} \quad \text{[Math. 6]}$$

In the aforementioned manner, the first score calculation unit 40 calculates the first score with respect to (i,j)=(1,2), (1,3), (2,4), and calculates the second score with respect to (i,j)=(2,2), (2,3), (1,4). Furthermore, the second score calculation unit 50 calculates the third score with respect to (i,j)=(1,1), and calculates the fourth score with respect to (i,j)=(2,1).

Using a gradient method, the parameter learning unit 60 updates the entity distributed representations, the predicate distributed representations, and further the weight parameters of the recurrent neural network that derives distributed representations of text representations.

First, the parameter learning unit 60 randomly samples the elements (i,j) (=(1,1), (1,2), (1,3), (2,4)) corresponding to the first facts or the second facts in the score matrix Y. Next, the parameter learning unit 60 randomly samples the elements (i'j) (=(1,4), (2,2), (2,3), (2,1)) that do not correspond to the first facts or the second facts in the score matrix Y Then, the parameter learning unit 60 calculates the scores θij and the scores θi'j of respective elements that have been sampled, and updates the entity distributed representations, the predicate distributed representations, and the weight parameters of the recurrent neural network with use of a gradient method so that the loss indicated by the following Math. 7 is reduced.

$$\text{Loss} = -\log(\sigma(\theta_{ij} - \theta_{i'j})) \qquad [\text{Math. 7}]$$

A description is now given of a method of extracting an entity combination that establishes a pre-defined predicate relationship in a case where the entity distributed representations, the predicate distributed representations, and the weight parameters of the recurrent neural network have been updated using the aforementioned method.

For example, assume a case where whether <B.W., D.H., J.M.> corresponding to the aforementioned i=2 establishes the predicate relationship Cast As (corresponding to j=1) is to be determined. In this case, a score $\theta_{21}$ is calculated with respect to the entity combination <B.W., D.H., J.M.> and the predicate Cast As with use of a method similar to the aforementioned calculation method used by the second score calculation unit 50. Then, when this calculated score $\theta_{21}$ exceeds a set threshold, it is determined that <B.W., D.H., J.M.> establishes the predicate relationship Cast As.

Effects of Example Embodiment

As described above, according to the present example embodiment, with respect to a pair that has been extracted as the first fact or the second fact among pairs of an entity combination and a predicate relationship or a text representation, learning of parameters is performed so that a high score is calculated compared to a pair that has not been extracted thereas. This, accordingly, achieves an advantageous effect whereby, in a case where a first fact and a second fact including a combination of similar entities have been obtained, there is a similar tendency between the predicate relationships and the text representations in terms of the magnitudes of scores. Due to this similarity relationship, a predicate relationship can be predicted even from a text representation to which a label of a predicate relationship has not been directly appended in training data.

Also, vectors of respective arguments of a text representation (distributed representations of the text representation) are calculated from the same recurrent neural network (model). Therefore, a text representation that is somewhat different from a text representation that appears at the time of learning is also generalized based on the elements that are partially common to the text representations. Furthermore, in the score calculation, an entity combination is used as a combination of vectors that respectively correspond to the entities composing this combination (entity distributed representations). As a result, it is possible to deal also with the extraction of a predicate relationship with three or more clauses in which exactly the same text representation, or exactly the same entity combination, appears with low frequency.

In addition, consequently, learning of parameters for extracting a predicate relationship from a document can be performed efficiently, which increases the processing speed in a calculator that executes the learning.

[Program]

It is sufficient that the program according to the present example embodiment be a program that causes a computer to execute steps A1 to A9 illustrated in FIG. 4. The parameter learning apparatus 100 and the parameter learning method according to the present example embodiment can be realized by installing this program in the computer and executing this program. In this case, a processor of the computer functions and performs processing as the first fact obtainment unit 10, second fact obtainment unit 20, distributed representation calculation unit 30, first score calculation unit 40, second score calculation unit 50, and parameter learning unit 60.

Also, in the present example embodiment, the document storage unit 70, distributed representation storage unit 80, and model parameter storage unit 90 are realized by storing a data file that configures these in a storage device included in the computer, such as a hard disk. Furthermore, the document storage unit 70, distributed representation storage unit 80, and model parameter storage unit 90 may be constructed on a computer different from the computer that executes the program according to the present example embodiment.

Moreover, the program according to the present example embodiment may be executed by a computer system constructed by a plurality of computers. In this case, for example, each computer may function as one of the first fact obtainment unit 10, second fact obtainment unit 20, distributed representation calculation unit 30, first score calculation unit 40, second score calculation unit 50, and parameter learning unit 60.

Figure 7:
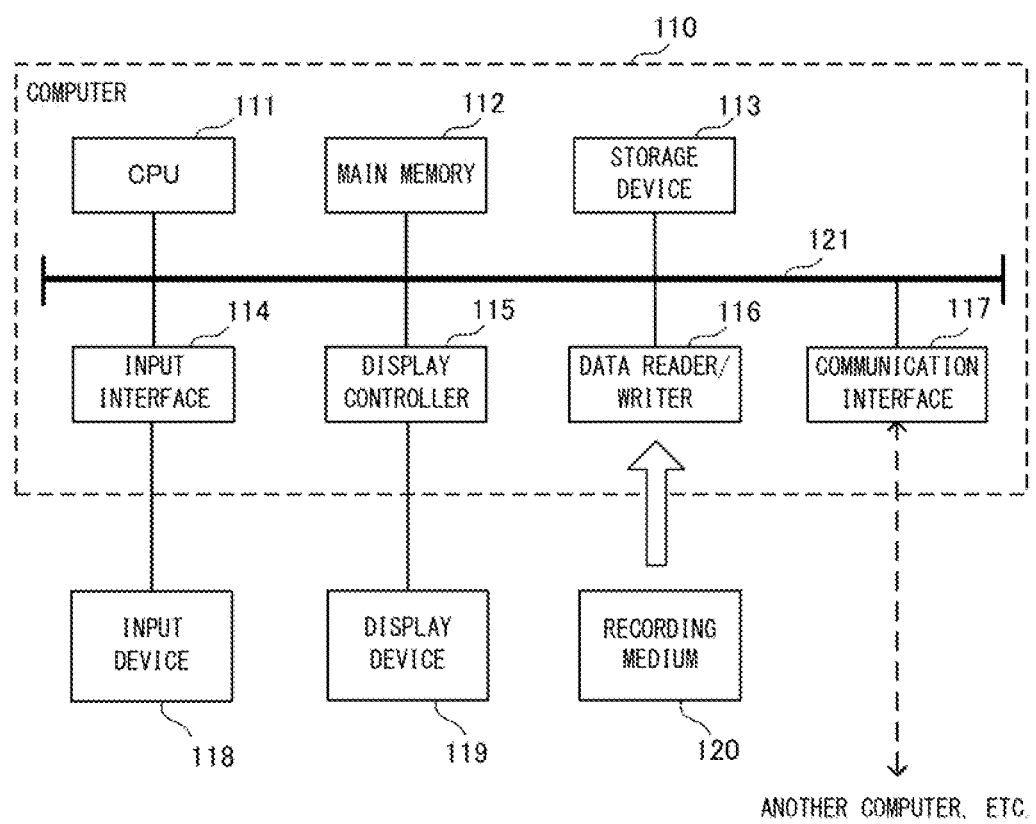
FIG. 7 is a block diagram illustrating one example of a computer that realizes the parameter learning apparatus according to the example embodiment.

Using FIG. 7, a description is now given of a computer that realizes the parameter learning apparatus 100 by executing the program according to the present example embodiment. FIG. 7 is a block diagram illustrating one example of the computer that realizes the parameter learning apparatus according to the example embodiment.

As illustrated in FIG. 7, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121. Note that the computer 110 may include a GPU (Graphics Processing Unit) or an FPGA (Field-Programmable Gate Array) in addition to the CPU 111 or in place of the CPU 111.

The CPU 111 carries out various types of computation by deploying the program (codes) according to the present example embodiment stored in the storage device 113 to the main memory 112, and executing the deployed program in a predetermined order. The main memory 112 is typically a volatile storage device, such as a DRAM (Dynamic Random Access Memory). Also, the program according to the present example embodiment is provided in a state where it is stored in a computer readable recording medium 120. Note that the program according to the present example embodiment may also be distributed over the Internet connected via the communication interface 117.

Furthermore, specific examples of the storage device 113 include a hard disk drive, and also a semiconductor storage device, such as a flash memory. The input interface 114 mediates data transmission between the CPU 111 and an input apparatus 118, such as a keyboard and a mouse. The display controller 115 is connected to a display apparatus 119, and controls displays on the display apparatus 119.

The data reader/writer 116 mediates data transmission between the CPU 111 and the recording medium 120, and executes readout of the program from the recording medium 120, as well as writing of the result of processing in the computer 110 to the recording medium 120. The communication interface 117 mediates data transmission between the CPU 111 and another computer.

Also, specific examples of the recording medium 120 include: a general-purpose semiconductor storage device, such as CF (Compact Flash®) and SD (Secure Digital); a magnetic recording medium, such as Flexible Disk; and an optical recording medium, such as CD-ROM (Compact Disk Read Only Memory).

Note that the parameter learning apparatus 100 according to the present example embodiment can also be realized by using items of hardware corresponding to respective components, rather than by using the computer with the program installed therein. Furthermore, a part of the parameter learning apparatus 100 may be realized by the program, and the remaining part of the parameter learning apparatus 100 may be realized by hardware.

A part or all of the aforementioned example embodiment can be described as, but is not limited to, the following (Supplementary Note 1) to (Supplementary Note 6).

(Supplementary Note 1)

A parameter learning apparatus including:

a first fact obtainment unit configured to, based on a document in which entities represented by a string of words appear and on information indicating appearance positions of entities within a predetermined range in the document, obtain, as first facts, pairs of a combination of entities which co-occur in the document and which are within the predetermined range, and a text representation to which the combination can be applied;

a second fact obtainment unit configured to extract, from a database in which entities and related predicates have been registered in advance, a predicate related to the combination of entities within the predetermined range, and obtain, as second facts, pairs of the extracted predicate and the combination of entities within the predetermined range related thereto;

a distributed representation calculation unit configured to
obtain, from the text representation in each of the obtained first facts, a word distributed representation that represents a word by means of a real vector for each word that composes the text representation, input the obtained word distributed representations to a recurrent neural network, and cause outputting of a series of real vectors that are different from the word distributed representations, the recurrent neural network using a series of the predetermined number of real vectors as inputs and outputting the predetermined number of different real vectors, and further specify, from the series of different real vectors that has been output, real vectors corresponding to appearance positions of entities in the corresponding first fact, and extract the specified real vectors as distributed representations of the text representation in the corresponding first fact;

a first score calculation unit configured to for each of the obtained first facts, calculate a first score indicating a degree of establishment of the first fact based on the distributed representations of the text representation that have been extracted in connection with the first fact, and on entity distributed representations that respectively represent features of entities in the first fact by means of real vectors, and also with respect to a pair of an entity combination and a text representation that has not been obtained as the first fact, calculate a second score indicating a degree of establishment of the pair based on distributed representations obtained from the text representation and on entity distributed representations that represent features of entities composing the entity combination by means of real vectors;

a second score calculation unit configured to for each of the obtained second facts, calculate a third score indicating a degree of establishment of the second fact based on predicate distributed representations that represent features of the predicate in the second fact by means of real vectors, and on entity distributed representations that respectively represent features of entities in the second fact by means of real vectors, and also with respect to a pair of an entity combination and a predicate that has not been obtained as the second fact, calculate a fourth score indicating a degree of establishment of the pair based on predicate distributed representations that represent features of the predicate by means of real vectors, and on entity distributed representations that represent characteristics of entities composing the entity combination by means of real vectors; and a parameter learning unit configured to update the entity distributed representations, the predicate distributed representations, or weight parameters of the recurrent neural network with use of a gradient method, so that the first score becomes higher than at least one of the second score and the fourth score, and the third score becomes higher than at least one of the second score and the fourth score.

(Supplementary Note 2)

The parameter learning apparatus according to Supplementary Note 1 further including:

a distributed representation storage unit configured to store, for each entity, an entity distributed representation that represents features of the entity by means of a real vector, and store, for each predicate, a predicate distributed representation that represents features of the predicate by means of a real vector; and a model parameter storage unit configured to store weight parameters of a recurrent neural network that uses a series of the predetermined number of real vectors as inputs, and outputs the predetermined number of different real vectors.

(Supplementary Note 3)

A parameter learning method including:

(a) a step of, based on a document in which entities represented by a string of words appear and on information indicating appearance positions of entities within a predetermined range in the document, obtaining, as first facts, pairs of a combination of entities which co-occur in the document and which are within the predetermined range, and a text representation to which the combination can be applied;

(b) a step of extracting, from a database in which entities and related predicates have been registered in advance, a predicate related to the combination of entities within the predetermined range, and obtaining, as second facts, pairs of the extracted predicate and the combination of entities within the predetermined range related thereto;

(c) a step of obtaining, from the text representation in each of the obtained first facts, a word distributed representation that represents a word by means of a real vector for each word that composes the text representation, inputting the obtained word distributed representations to a recurrent neural network, and causing outputting of a series of real vectors that are different from the word distributed representations, the recurrent neural network using a series of the predetermined number of real vectors as inputs and outputting the predetermined number of different real vectors, and further specifying, from the series of different real vectors that has been output, real vectors corresponding to appearance positions of entities in the corresponding first fact, and extracting the specified real vectors as distributed representations of the text representation in the corresponding first fact;

(d) a step of for each of the obtained first facts, calculating a first score indicating a degree of establishment of the first fact based on the distributed representations of the text representation that have been extracted in connection with the first fact, and on entity distributed representations that respectively represent features of entities in the first fact by means of real vectors, and also with respect to a pair of an entity combination and a text representation that has not been obtained as the first fact, calculating a second score indicating a degree of establishment of the pair based on distributed representations obtained from the text representation and on entity distributed representations that represent features of entities composing the entity combination by means of real vectors;

(e) a step of for each of the obtained second facts, calculating a third score indicating a degree of establishment of the second fact based on predicate distributed representations that represent features of the predicate in the second fact by means of real vectors, and on entity distributed representations that respectively represent features of entities in the second fact by means of real vectors, and also with respect to a pair of an entity combination and a predicate that has not been obtained as the second fact, calculating a fourth score indicating a degree of establishment of the pair based on predicate distributed representations that represent features of the predicate by means of real vectors, and on entity distributed representations that represent features of entities composing the entity combination by means of real vectors; and (f) a step of updating the entity distributed representations, the predicate distributed representations, or weight parameters of the recurrent neural network with use of a gradient method, so that the first score becomes higher than at least one of the second score and the fourth score, and the third score becomes higher than at least one of the second score and the fourth score.

(Supplementary Note 4)

The parameter learning method according to Supplementary Note 3 further including:

(g) a step of storing, for each entity, an entity distributed representation that represents features of the entity by means of a real vector, and storing, for each predicate, a predicate distributed representation that represents features of the predicate by means of a real vector; and (h) a step of storing weight parameters of a recurrent neural network that uses a series of the predetermined number of real vectors as inputs, and outputs the predetermined number of different real vectors.

(Supplementary Note 5)

A computer readable recording medium that includes a program recorded thereon, the program including instructions that cause a computer to carry out (a) a step of, based on a document in which entities represented by a string of words appear and on information indicating appearance positions of entities within a predetermined range in the document, obtaining, as first facts, pairs of a combination of entities which co-occur in the document and which are within the predetermined range, and a text representation to which the combination can be applied, (b) a step of extracting, from a database in which entities and related predicates have been registered in advance, a predicate related to the combination of entities within the predetermined range, and obtaining, as second facts, pairs of the extracted predicate and the combination of entities within the predetermined range related thereto, (c) a step of obtaining, from the text representation in each of the obtained first facts, a word distributed representation that represents a word by means of a real vector for each word that composes the text representation, inputting the obtained word distributed representations to a recurrent neural network, and causing outputting of a series of real vectors that are different from the word distributed representations, the recurrent neural network using a series of the predetermined number of real vectors as inputs and outputting the predetermined number of different real vectors, and further specifying, from the series of different real vectors that has been output, real vectors corresponding to appearance positions of entities in the corresponding first fact, and extracting the specified real vectors as distributed representations of the text representation in the corresponding first fact, (d) a step of for each of the obtained first facts, calculating a first score indicating a degree of establishment of the first fact based on the distributed representations of the text representation that have been extracted in connection with the first fact, and on entity distributed representations that respectively represent features of entities in the first fact by means of real vectors, and also with respect to a pair of an entity combination and a text representation that has not been obtained as the first fact, calculating a second score indicating a degree of establishment of the pair based on distributed representations obtained from the text representation and on entity distributed representations that represent features of entities composing the entity combination by means of real vectors, (e) a step of for each of the obtained second facts, calculating a third score indicating a degree of establishment of the second fact based on predicate distributed representations that represent features of the predicate in the second fact by means of real vectors, and on entity distributed representations that respectively represent features of entities in the second fact by means of real vectors, and also with respect to a pair of an entity combination and a predicate that has not been obtained as the second fact, calculating a fourth score indicating a degree of establishment of the pair based on predicate distributed representations that represent features of the predicate by means of real vectors, and on entity distributed representations that represent features of entities composing the entity combination by means of real vectors, and (f) a step of updating the entity distributed representations, the predicate distributed representations, or weight parameters of the recurrent neural network with use of a gradient method, so that the first score becomes higher than at least one of the second score and the fourth score, and the third score becomes higher than at least one of the second score and the fourth score.

(Supplementary Note 6)

The computer readable recording medium according to Supplementary Note 5, wherein the program further includes instructions that cause the computer to carry out (g) a step of storing, for each entity, an entity distributed representation that represents features of the entity by means of a real vector, and storing, for each predicate, a predicate distributed representation that represents features of the predicate by means of a real vector, and (h) a step of storing weight parameters of a recurrent neural network that uses a series of the predetermined number of real vectors as inputs, and outputs the predetermined number of different real vectors.

While the invention of the present application has been described above with reference to the example embodiment, the invention of the present application is not limited to the aforementioned example embodiment. Various changes that can be understood by a person skilled in the art within the scope of the invention of the present application can be made to the configurations and details of the invention of the present application.

INDUSTRIAL APPLICABILITY

As described above, according to the present invention, a text representation with no label appended thereto can also be used as learning data in the extraction of a predicate relationship from a document, and in addition, parameters for the extraction can be learned so that the performance is not influenced by the number of arguments of a predicate to be output. The present invention is useful in various fields in which the extraction of a predicate relationship from a document is required, for example, in abduction inference.

REFERENCE SIGNS LIST 10 first fact obtainment unit
20 second fact obtainment unit
30 distributed representation calculation unit
40 first score calculation unit
50 second score calculation unit
60 parameter learning unit
70 document storage unit
80 distributed representation storage unit
90 model parameter storage unit
100 parameter learning apparatus
101 predicate database
110 computer
111 CPU
112 main memory
113 storage device
114 input interface
115 display controller
116 data reader/writer
117 communication interface
118 input device
119 display device
120 recording medium
121 bus

What is claimed is:

1. A parameter learning apparatus comprising:

at least one memory storing instructions; and at least one processor configured to execute the instructions to:

obtain, based on a document in which entities represented by a string of words appear and on information indicating appearance positions of entities within a predetermined range in the document, as first facts, pairs of a combination of entities which co-occur in the document and which are within the predetermined range, and a text representation to which the combination can be applied;

extract, from a database in which entities and related predicates have been registered in advance, a predicate related to the combination of entities within the predetermined range, and obtain, as second facts, pairs of the extracted predicate and the combination of entities within the predetermined range related thereto;

obtain, from the text representation in each of the obtained first facts, a word distributed representation that represents a word by means of a real vector for each word that composes the text representation, input the obtained word distributed representations to a recurrent neural network, and cause outputting of a series of real vectors that are different from the word distributed representations, the recurrent neural network using a series of the predetermined number of real vectors as inputs and outputting the predetermined number of different real vectors, and further specify, from the series of different real vectors that has been output, real vectors corresponding to appearance positions of entities in the corresponding first fact, and extracting the specified real vectors as distributed representations of the text representation in the corresponding first fact;

calculate, for each of the obtained first facts, a first score indicating a degree of establishment of the first fact based on the distributed representations of the text representation that have been extracted in connection with the first fact, and on entity distributed representations that respectively represent features of entities in the first fact by means of real vectors, and also, calculate, with respect to a pair of an entity combination and a text representation that has not been obtained as the first fact, a second score indicating a degree of establishment of the pair based on distributed representations obtained from the text representation and on entity distributed representations that represent features of entities composing the entity combination by means of real vectors;

calculate, for each of the obtained second facts, a third score indicating a degree of establishment of the second fact based on predicate distributed representations that represent features of the predicate in the second fact by means of real vectors, and on entity distributed representations that respectively represent features of entities in the second fact by means of real vectors, and also, calculate, with respect to a pair of an entity combination and a predicate that has not been obtained as the second fact, a fourth score indicating a degree of establishment of the pair based on predicate distributed representations that represent features of the predicate by means of real vectors, and on entity distributed representations that represent characteristics of entities composing the entity combination by means of real vectors; and update the entity distributed representations, the predicate distributed representations, or weight parameters of the recurrent neural network with use of a gradient method, so that the first score becomes higher than at least one of the second score and the fourth score, and the third score becomes higher than at least one of the second score and the fourth score.

2. The parameter learning apparatus according to claim 1 wherein, further at least one processor configured to execute the instructions to:

store, for each entity, an entity distributed representation that represents features of the entity by means of a real vector, and store, for each predicate, a predicate distributed representation that represents features of the predicate by means of a real vector; and store weight parameters of a recurrent neural network that uses a series of the predetermined number of real vectors as inputs, and outputs the predetermined number of different real vectors.

3. A parameter learning method comprising:

obtaining, as first facts, pairs of a combination of entities which co-occur in the document and which are within the predetermined range, and a text representation to which the combination can be applied, based on a document in which entities represented by a string of words appear and on information indicating appearance positions of entities within a predetermined range in the document;

extracting, from a database in which entities and related predicates have been registered in advance, a predicate related to the combination of entities within the predetermined range, and obtaining, as second facts, pairs of the extracted predicate and the combination of entities within the predetermined range related thereto;

obtaining, from the text representation in each of the obtained first facts, a word distributed representation that represents a word by means of a real vector for each word that composes the text representation, inputting the obtained word distributed representations to a recurrent neural network, and causing outputting of a series of real vectors that are different from the word distributed representations, the recurrent neural network using a series of the predetermined number of real vectors as inputs and outputting the predetermined number of different real vectors, and further specifying, from the series of different real vectors that has been output, real vectors corresponding to appearance positions of entities in the corresponding first fact, and extracting the specified real vectors as distributed representations of the text representation in the corresponding first fact;

calculating, for each of the obtained first facts, a first score indicating a degree of establishment of the first fact based on the distributed representations of the text representation that have been extracted in connection with the first fact, and on entity distributed representations that respectively represent features of entities in the first fact by means of real vectors, and also calculating, with respect to a pair of an entity combination and a text representation that has not been obtained as the first fact, a second score indicating a degree of establishment of the pair based on distributed representations obtained from the text representation and on entity distributed representations that represent features of entities composing the entity combination by means of real vectors;

calculating, for each of the obtained second facts, a third score indicating a degree of establishment of the second fact based on predicate distributed representations that represent features of the predicate in the second fact by means of real vectors, and on entity distributed representations that respectively represent features of entities in the second fact by means of real vectors, and also calculating, with respect to a pair of an entity combination and a predicate that has not been obtained as the second fact, a fourth score indicating a degree of establishment of the pair based on predicate distributed representations that represent features of the predicate by means of real vectors, and on entity distributed representations that represent features of entities composing the entity combination by means of real vectors; and updating the entity distributed representations, the predicate distributed representations, or weight parameters of the recurrent neural network with use of a gradient method, so that the first score becomes higher than at least one of the second score and the fourth score, and the third score becomes higher than at least one of the second score and the fourth score.

4. The parameter learning method according to claim 3 further comprising:

storing, for each entity, an entity distributed representation that represents features of the entity by means of a real vector, and storing, for each predicate, a predicate distributed representation that represents features of the predicate by means of a real vector; and storing weight parameters of a recurrent neural network that uses a series of the predetermined number of real vectors as inputs, and outputs the predetermined number of different real vectors.

5. A non-transitory computer readable recording medium that includes a program recorded thereon, the program including instructions that cause a computer to carry out based on a document in which entities represented by a string of words appear and on information indicating appearance positions of entities within a predetermined range in the document, obtaining, as first facts, pairs of a combination of entities which co-occur in the document and which are within the predetermined range, and a text representation to which the combination can be applied, extracting, from a database in which entities and related predicates have been registered in advance, a predicate related to the combination of entities within the predetermined range, and obtaining, as second facts, pairs of the extracted predicate and the combination of entities within the predetermined range related thereto, obtaining, from the text representation in each of the obtained first facts, a word distributed representation that represents a word by means of a real vector for each word that composes the text representation, inputting the obtained word distributed representations to a recurrent neural network, and causing outputting of a series of real vectors that are different from the word distributed representations, the recurrent neural network using a series of the predetermined number of real vectors as inputs and outputting the predetermined number of different real vectors, and further specifying, from the series of different real vectors that has been output, real vectors corresponding to appearance positions of entities in the corresponding first fact, and extracting the specified real vectors as distributed representations of the text representation in the corresponding first fact, for each of the obtained first facts, calculating a first score indicating a degree of establishment of the first fact based on the distributed representations of the text representation that have been extracted in connection with the first fact, and on entity distributed representations that respectively represent features of entities in the first fact by means of real vectors, and also with respect to a pair of an entity combination and a text representation that has not been obtained as the first fact, calculating a second score indicating a degree of establishment of the pair based on distributed representations obtained from the text representation and on entity distributed representations that represent features of entities composing the entity combination by means of real vectors, for each of the obtained second facts, calculating a third score indicating a degree of establishment of the second fact based on predicate distributed representations that represent features of the predicate in the second fact by means of real vectors, and on entity distributed representations that respectively represent features of entities in the second fact by means of real vectors, and also with respect to a pair of an entity combination and a predicate that has not been obtained as the second fact, calculating a fourth score indicating a degree of establishment of the pair based on predicate distributed representations that represent features of the predicate by means of real vectors, and on entity distributed representations that represent features of entities composing the entity combination by means of real vectors, and updating the entity distributed representations, the predicate distributed representations, or weight parameters of the recurrent neural network with use of a gradient method, so that the first score becomes higher than at least one of the second score and the fourth score, and the third score becomes higher than at least one of the second score and the fourth score.

6. The non-transitory computer readable recording medium according to claim 5, wherein the program further includes instructions that cause the computer to carry out storing, for each entity, an entity distributed representation that represents features of the entity by means of a real vector, and storing, for each predicate, a predicate distributed representation that represents features of the predicate by means of a real vector, and storing weight parameters of a recurrent neural network that uses a series of the predetermined number of real vectors as inputs, and outputs the predetermined number of different real vectors.

* * * * *